United States Patent [19]

Andrick

[11] Patent Number: 4,602,792

[45] Date of Patent: * Jul. 29, 1986

[54] DUAL FUNCTION GASKET WITH DUAL LIPS AND OPTIONAL LOCKING RING

[75] Inventor: William C. Andrick, Uniontown, Ohio

[73] Assignee: Polymer/Raymond Industries, Middlefield, Ohio

[ * ] Notice: The portion of the term of this patent subsequent to Nov. 29, 2002 has been disclaimed.

[21] Appl. No.: 658,743

[22] Filed: Oct. 9, 1984

[51] Int. Cl.⁴ .................. F16J 15/12; F16L 17/02
[52] U.S. Cl. .................. 277/207 A; 277/166; 277/206 R; 285/111; 285/113; 285/232; 285/345; 285/379
[58] Field of Search .......... 277/152, 153, 166, 207 R, 277/207 A, 207 B, DIG. 2, 205, 206 R, 212 R, 212 C; 285/110–113, 230–232, 345, 379

[56] References Cited

U.S. PATENT DOCUMENTS

| 1,683,076 | 9/1928 | Johnson et al. ............ 277/207 A X |
| 2,980,449 | 4/1961 | Dunton . |
| 3,203,511 | 8/1965 | Long . |
| 4,034,994 | 7/1977 | Ohta et al. . |
| 4,143,884 | 3/1979 | Nicholas et al. . |
| 4,216,981 | 8/1980 | Jensen ............................. 285/110 X |
| 4,230,157 | 10/1980 | Larsen et al. ............... 277/207 A X |
| 4,343,480 | 8/1982 | Vassallo . |
| 4,379,559 | 4/1983 | Bohman ......................... 277/207 A |

FOREIGN PATENT DOCUMENTS 2815249 11/1978 Fed. Rep. of Germany ... 277/207 A
2900050 9/1979 Fed. Rep. of Germany ... 277/207 A Primary Examiner—Robert S. Ward
Attorney, Agent, or Firm—Fay, Sharpe, Fagan, Minnich & McKee

[57] ABSTRACT

A dual function gasket adapted for insertion into a suitable groove formed in the bell of an associated pipe includes an annular gasket body made of a resilient material. The body terminates radially inwardly in a leading lip and a pressure activated sealing lip spaced rearwardly therefrom. An annular groove is provided in the gasket body and an annular locking ring may be selectively inserted into the groove. The ring is made of a material harder than the gasket body and is inserted into the groove when a high pressure seal is desired. The ring may be removed when only a low pressure seal is desired.

20 Claims, 8 Drawing Figures

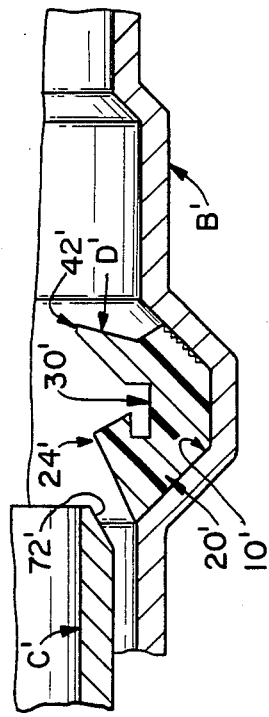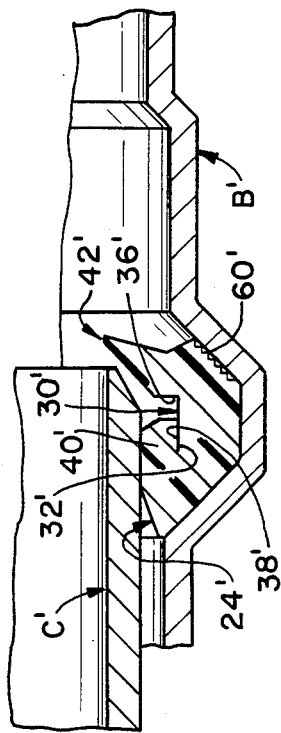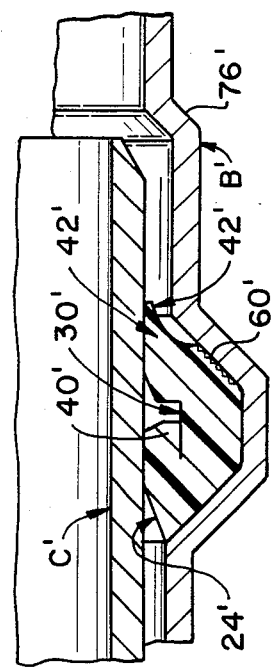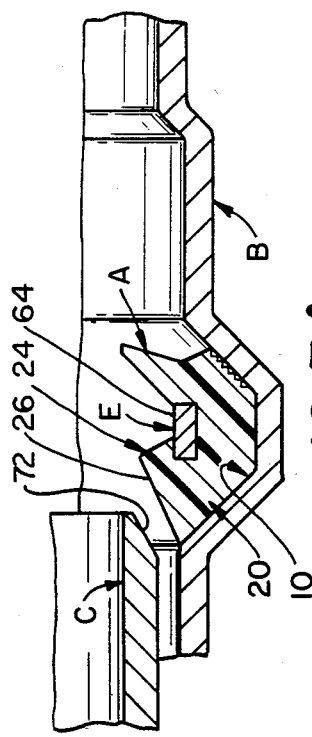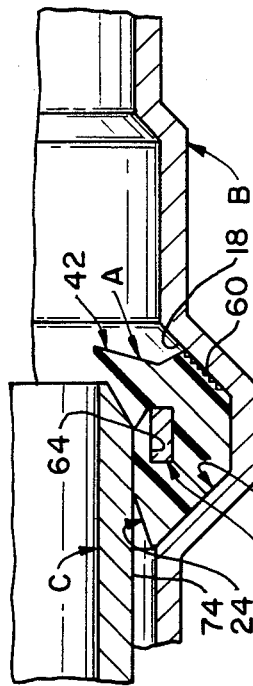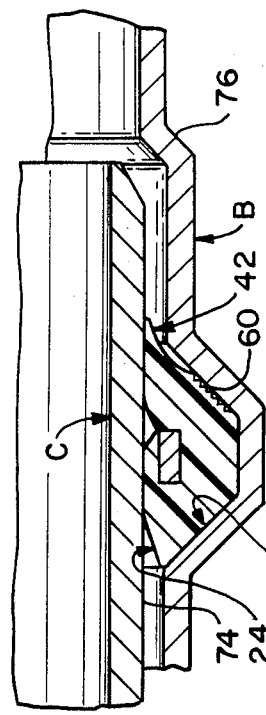

DUAL FUNCTION GASKET WITH DUAL LIPS AND OPTIONAL LOCKING RING

BACKGROUND OF THE INVENTION

This invention generally pertains to the field of pipe connections. More specifically, the present invention relates to a dual function gasket which is usable in a pipe connection.

The invention is particularly applicable to bell and spigot type joints which include a pipe with a bell end groove in which is received a gasket. However, it will be appreciated by those skilled in the art that the invention has broader applications and may also be adapted for use in many other sealing environments.

Pipes are used for the conveyance of water (or other fluids) under pressure, as in penstocks, inverted siphons, and city water lines. They may also be used as free-flow conduits running partly full, as in drains and sewers. Pipes for conveying water in appreciable quantities have been made of steel, cast iron, concrete, vitrified clay, and most recently, plastic.

It is well-known in the art to extrude plastic pipes in an elongated cylindrical configuration of a desired diameter and then cut the extruded product into individual lengths of convenient size suitable for handling, shipping, and installing. Ten and twenty foot lengths are standard for this type of work. Each length of pipe is enlarged or "belled" at one end sufficiently to join the next adjacent pipe section by receiving in the belled end, the unenlarged or "spigot" end of the adjacent length of pipe. The inside diameter of the bell is formed sufficiently large to receive the spigot end of the next section of pipe with sufficient clearance to allow the application of packing, caulking, gaskets or other seal devices designed to prevent leakage at pipe joints when a plurality of pipe lengths are joined to form a pipeline.

Prior workers in the art, particularly in the plastic pipe industry, have developed various gaskets of suitable design to be retained within an inwardly facing groove formed in the bell. These gaskets were configured to permit the pipe joint to be rapidly made and had the design goal of preventing leakage upon completion of the piping system. Difficulties have, however, been encountered in the formation of a leak tight seal under both pressure and vacuum conditions.

In an effort to solve sealing problems in piping systems, workers in the art have designed gaskets of the type having extending lips which press against the spigot end. Other workers have provided gaskets having peripheral grooves in which are seated locking rings to prevent the movement of the gasket and to retard gasket blow-out when system pressure was applied. Others have attempted to lock the gasket within the annular groove in the bell, for example, by machining the groove to an annular configuration to seal the gasket in the groove or by applying a threaded connection or an adhesive to secure the gasket in place. Such prior art attempts have, however, not proven to be entirely successful.

Sealing problems occur in pipelines for the reason that pipelines are frequently exposed to fairly high pressures. The pressures in a conventional pipeline, and hence on the gaskets, may vary from 0 to 250 psi. The American Water Works Association (AWWA) has set the following standards for pipelines: CIPS or high pressure pipe, such as used for fire hydrants and water mains, must withstand 250 psi; IPS or pressurized pipes, such as regular water supply lines, must withstand 160 psi; PIP or plastic irrigation pipe must withstand 50 psi and sewer pipe must withstand 20 psi.

Most gasket designs have been specifically configured to one of these pressure limitations and economical gaskets which can be used for two or more of these pressure limitations are not generally available. It would be useful, therefore, to have an inexpensively produced gasket which can be selectively configured to provide sealing under various pressure conditions. More specifically, it would be useful to provide a gasket which can be selectively configured to provide sealing under various pressures simply by the addition or removal of a reinforcing ring.

Accordingly, it has been considered desirable to develop a new and improved gasket assembly which would overcome the foregoing difficulties and meet the above stated needs and others while providing better and more advantageous overall results.

BRIEF SUMMARY OF THE INVENTION

In accordance with the present invention, a new and improved dual function gasket capable of both high and low pressure sealing is provided for pipe joints.

More particularly in accordance with the invention, the dual function gasket includes an annular gasket body made of a resilient material with the body terminating radially inwardly in a leading lip and a pressure actuated sealing lip spaced rearwardly therefrom. An annular groove is also provided in the gasket body with a rear portion of the leading lip overhanging the groove. An annular locking ring, made of a material harder than the gasket body, is selectively insertable into the groove. The ring is inserted into the groove when a high pressure seal is desired and is removed when only a low pressure seal is desired. The leading lip and groove are so dimensioned that the leading lip extends completely across a top surface of the locking ring to enclose the locking ring in the gasket body when a high pressure seal is provided.

In accordance with another aspect of the invention, the gasket body terminates radially outwardly in a generally polygonal outer surface including at least one planar section and a ratchet surfaced section disposed at an angle thereto. The outer face seats against an inner surface of an associated pipe bell.

According to another aspect of the invention, the ratchet surfaced section engages an inner side of the associated pipe bell at least at two separate spaced positions.

According to a further aspect of the invention, the ratchet surfaced section comprises a plurality of spaced annular ribs which engage the pipe bell inner surface to prevent leaks therealong and to prevent movement of the gasket in the bell.

In accordance with a still further aspect of the invention, the annular groove is rectangular in cross section and the ring is also rectangular in cross section.

According to still another aspect of the invention, the annular groove is located between the leading lip and the pressure actuated sealing lip.

In accordance with still another aspect of the invention, the pressure actuated sealing lip extends further radially inwardly than the leading lip.

In accordance with yet another aspect of the invention, the leading lip is conically shaped and serves as a pipe centering and cleaning face and a radially inward portion thereof also serves as a compression sealing face.

In accordance with yet still another aspect of the invention, the leading lip rear portion only extends over a portion of the annular groove when a low pressure seal is provided between two associated pipes and the locking ring is not provided in the groove.

The principal advantage of the present invention is the provision of a new dual function gasket assembly which can be used for either high pressure or low pressure sealing applications by the addition or removal of a locking ring in a gasket groove.

Another advantage of the invention is the provision of a gasket assembly in which a leading lip has a rear portion overhanging an annular groove for the locking ring and in which the leading lip and the annular groove are so dimensioned that the leading lip extends completely across a top surface of the locking ring positioned in the groove to enclose the locking ring in the gasket body when a high pressure seal is provided.

A further advantage of the invention is the provision of a gasket assembly having a leading lip, which provides a centering and cleaning face as well as a compression seal, and a sealing lip, which provides a pressure actuated seal.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein:

FIGS. 3A through 3C are reduced longitudinal cross-sectional views which show the process of insertion of a first pipe into a second pipe to form the pipe joint of FIG. 1, with the gasket assembly being adapted for a high pressure mode of use; and, FIGS. 4A through 4C are longitudinal cross-sectional views which show the process of insertion of a first pipe into a second pipe as in FIGS. 3A through 3C, with the gasket assembly of the present invention being adapted for a low pressure mode of use.

DETAILED DESCRIPTION OF THE PREFERRED EMBODIMENT

Figure 1:
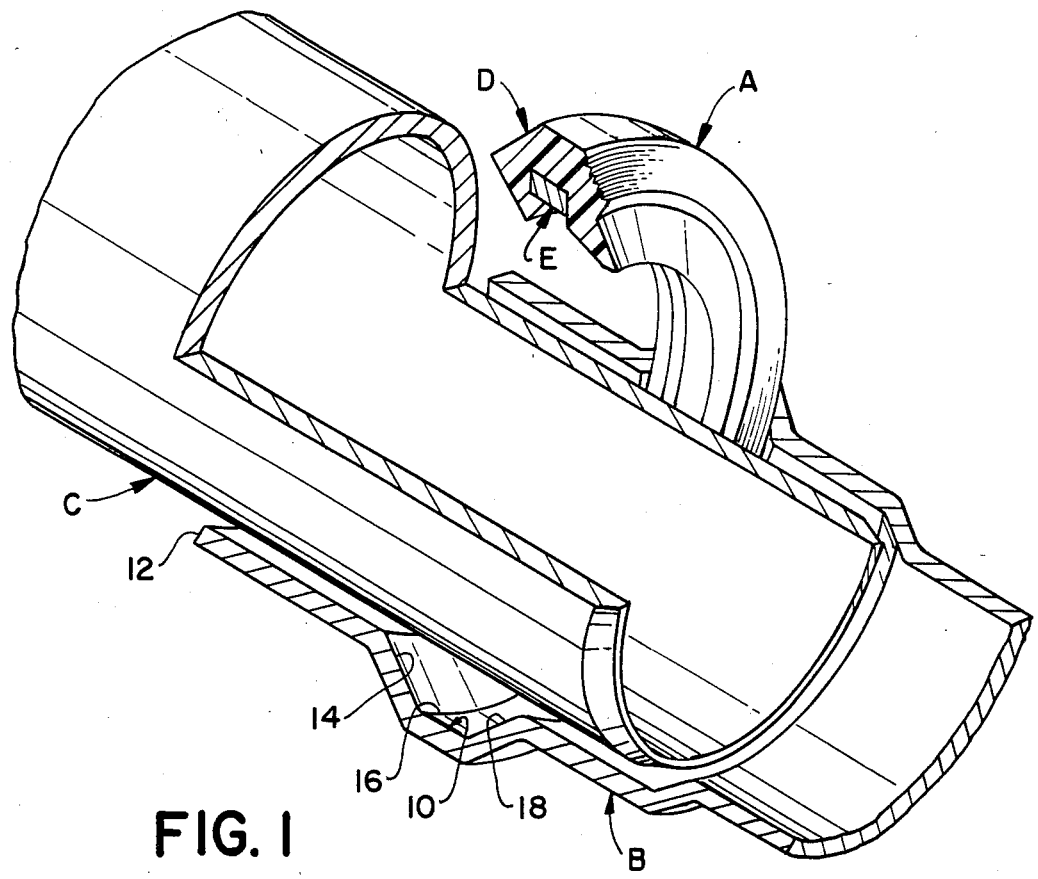
FIG. 1 is a perspective view in partial cross section of a gasket assembly according to the present invention being used in a pipe joint.

Referring now to the drawings, wherein the showings are for purposes of illustrating a preferred embodiment of the invention only and not for purposes of limiting same, FIG. 1 shows the subject new gasket assembly A in use to provide a sealing joint between a first pipe B and a second pipe C. While the gasket assembly is primarily designed for and will hereinafter be described in connection with a bell and spigot pipe joint used in both high and low pressure pipelines, it will be appreciated that the overall inventive concept involved could be adapted for use in other sealing environments as well.

More particularly, the gasket assembly A is positioned in a groove 10 of the first pipe B while the second pipe C extends through a pipe opening 12 of the first pipe B. It will be noted that the groove 10 is formed of sufficient depth to receive therein the gasket assembly A. The groove 10 is defined by three planar surfaces 14, 16, 18 which are positioned in an angular relation to each other. The pipes may be formed of a plastic material in a known manner, although they could also be formed from any other conventional pipe material.

Figure 2:
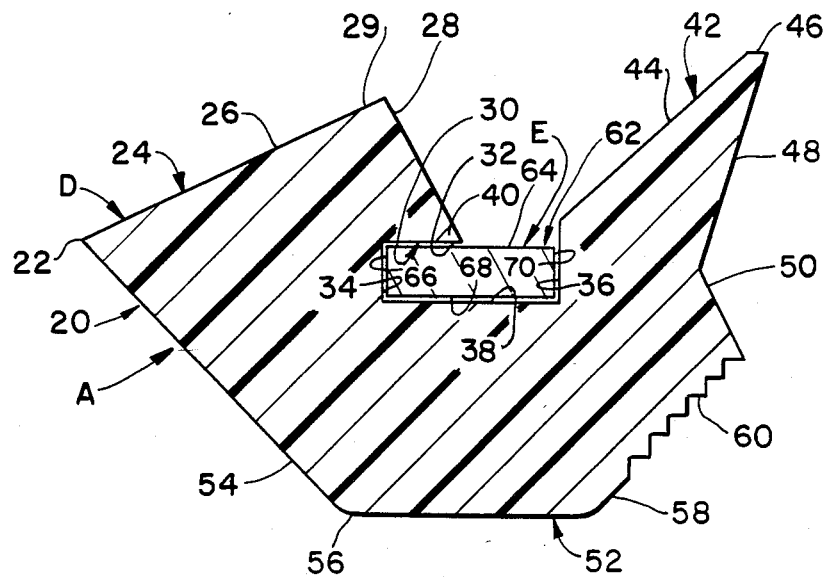
FIG. 2 is an enlarged side elevational view in cross section of the gasket assembly of the present invention.

With reference now to FIG. 2, the gasket assembly includes a gasket D having a body 20 with a forward tip 22 adjacent a leading lip 24. The leading lip is defined by a forward face 26 and a back face 28. The leading lip forward face 26 is used as a centering and cleaning face for the second pipe C and is conically shaped to center the second pipe C in the gasket D and hence in the first pipe B. An upper portion 29 of the forward face 26 also provides a compression seal against the second pipe.

A groove 30 is located adjacent the leading lip 24 and is defined by an upper wall 32, a pair of sidewalss 34, 36 and a bottom wall 38. The groove 30 extends partially into the leading lip 24 such that a portion 40 of the leading lip extends over the groove 30 defining the groove upper wall 32. A pressure actuated sealing lip 42 is positioned behind the groove and includes a forward face 44, a top face 46 and a back face 48. As is evident from the FIGURE, both the leading lip 24 and the sealing lip 42 are essentially triangular in configuration.

The sealing lip back face 48 lies adjacent to an angular face 50 which, in turn, is adjacent a bottom periphery 52 of the gasket body 20. The bottom periphery 52 is composed of three angular faces 54, 56, 58. A portion of the rear bottom face 58 is ridged such that it is provided with a series of identations 60. These identations or ribs are meant to engage the pipe bell groove back surface 18 in a plurality of places in a sealing manner to prevent leakage therealong. The ribs 60 are also useful in preventing movement of the gasket in the pipe groove 10 during the insertion of the second pipe C in the first pipe B. To this end, the ribs 60 act much like the tread on a tire or the sole of a tennis shoe to prevent rearward creep or "walk" of the gasket up the pipe groove back wall 18 during the insertion of the second pipe C into the first pipe B.

Insertable in the groove 30 of the gasket body 20 is an annular reinforcing member or ring E having a body 62. Since the groove 30 is preferably essentially rectangular, the reinforcing ring E is also rectangular so that it can be closely received within the groove. To this end, the reinforcing ring E is provided with a planar upper surface 64, a first side surface 66, a bottom surface 68 and a second side surface 70.

The gasket body overhang portion 40 extends over, and is closely adjacent to, a portion of the reinforcing ring upper surface 64 to retain the ring E in the gasket body groove 30. When the second pipe C is positioned in the first pipe B, the leading lip 24 is forced down against the gasket body 20 and the overhang portion spreads over a greater amount of the reinforcing ring upper surface to more securely hold the ring in place. Preferably, the overhang portion 40 is so dimensioned that it will extend over the entire upper surface 64 of the reinforcing ring E when the leading lip 24 is compressed by the second pipe C, thereby encapsulating the ring as shown in FIGS. 3B and 3C. In other words, the leading lip back face 28 will contact the groove second side wall 36 and enclose the ring E within the gasket body 20. This is advantageous because it seals the ring E against the environment and protects it from dust, dirt or harmful chemicals which may be carried by the pipeline.

As mentioned, the leading lip 24 performs two functions. It provides a wiping seal against the second pipe C to clean it of dirt, metal shavings, burrs or the like. An upper portion 29 of it also provides a compression seal against the second pipe after set. The sealing lip 42 provides a pressure actuated seal against the second pipe C.

Preferably, the gasket body 20 is made of a resilient, moisture proof material, such as rubber, to provide efficient sealing between the two pipes B, C. It should, however, be appreciated that other suitable conventional materials could also be used. Thus, the gasket D may be made of any suitable elastomer which is moisture-proof, resilient and firm yet stretchable, for example, a material having a durometer value of approximately 50 to 70.

The reinforcing ring E may be manufactured of any material harder than the gasket D and is usually made of a plastic material. Suitable hard plastic materials for such purpose include nylon, polpropylene and polyvinylchloride. The reinforcing ring E to some extent also stiffens the gasket D without interfering with its sealing function or the sealing efficiency of the leading and sealing lips 24, 42.

When used to provide a relatively high pressure seal, such as in a plastic irrigation pipe where the gasket D must withstand 50 psi or even an IPS pipe which must withstand 160 psi, and with reference now to FIG. 3A, the gasket assembly A includes the reinforcing ring E. The second pipe C is shown in the process of being inserted into the first pipe B with the gasket assembly being positioned within the groove 10 of the first pipe. As a forward surface 72 of the second pipe C encounters the forward face 26 of the leading lip 24, the leading lip is compressed against the gasket body 20. As mentioned, the leading lip forward face 26 has a conical-shape and serves to center the second pipe C in the first pipe B. Also, dirt, grime, burrs, shavings or other foreign matter are wiped off the forward face 72 and an outer periphery or surface 74 of the inner pipe C by the leading lip forward face 26 to provide a clean sealing surface.

The upper portion 29 of the forward face 26 serves to provide a compression seal against the second pipe outer surface 74. This seal is used to prevent infiltration of air or other fluids or solids when a vacuum is pulled on the pipeline. In other words, the function of the forward face top portion 29 is to prevent fluids or solids outside the pipeline from entering it when the pipeline undergoes a temporary vacuum condition as, for example, in a plastic irrigation pipe when a valve on the pipeline is opened and water flows through the pipe. Since the second pipe outer periphery 74 contacts a radially inner portion of the forward face so that the pipe can be centered and wiped thereby, it is evident that the pipe will need to push against the top portion 29 of the forward face. Thus, that portion of the forward face 24 is pushed radially outwardly as the second pipe C enters and passes through the gasket D. In this way, an intimate contact between the second pipe outer periphery 74 and the upper portion 29 of the forward face 24 is assured so that the leading lip can provide a compression seal against the second pipe.

Since a portion of the gasket leading lip 24 overhangs the reinforcing ring E, as the leading lip is compressed by the outer periphery 74 of the second pipe C, the leading lip will spread back over the upper surface 64 of the reinforcing ring to enclose it as shown in FIG. 3B and as discussed above. The reinforcing ring E stiffens the gasket D and also assists the compression seal provided by the upper portion 29 of the forward face 26.

With reference now to FIG. 3C, the second pipe C is there shown as having encountered and extended over the pressure actuated sealing lip 42. This lip is also compressed against the gasket body 20 while the lip sealingly engages the outer periphery 74 of the second pipe C. The pressure actuated sealing lip 42 is meant to provide a fluid pressure actuated seal between the two pipes B, C. This seal is activated by the fluid pressure in the pipeline and is meant to prevent the outward leakage or seepage of pressurized fluid between the pipe sections.

If, on the other hand, a vacuum were suddenly pulled on the pipeline, this seal 42 may not be effective in preventing the inward seepage of fluids into the pipeline. That is the function of the compression seal provided by the top portion 29 of the leading lip forward surface 26. The latter, in turn, could not prevent the outward seepage of pressurized fluid from the pipeline. Thus, as can be seen, the gasket assembly of the present invention provides a pipe centering and cleaning face as well as a compression sealing face on the forward surface 26 of the leading lip 24, as well as a pressure activated sealing lip 42. In other words, two separate, spaced apart, seals are provided between the two pipes B, C including a compression seal and a pressure actuated seal to provide for complete sealing between the pipe sections.

The plurality of outer ridges 60 positioned on the outer face 52 of the gasket provides for a thorough sealing against the back wall 18 of the pipe bell. A plurality of annular seals are thus provided against pipe bell 10 by the gasket ridges 60. Also, the ridges 60 serve to prevent displacement of the gasket from the groove 10 of the first pipe B.

The second pipe C extends into the first pipe B approximately as far as an indented portion 76 of the first pipe. This indented portion 76, as well as the groove or bell 10, may be formed in a conventional bell and spigot pipe making machine.

In the embodiment illustrated in FIGS. 1-3, the gasket assembly A is adapted for use in relatively high pressure environments, such as the 50 psi of PIP pipes or even the 160 psi of IPS pipes. The retaining ring E prevents gasket movement relative to the first pipe groove 10 even under such pressures. Additionally, the ring E retains the two gasket lips 24, 42 in tight sealing engagement with the outer periphery 74 of the second pipe C despite high pressures.

With reference now to the alternate embodiment of FIGS. 4A-4C, the seal assembly is there shown as being adapted for use in a relatively low pressure environment, such as a sewer pipe, in which the gasket could be exposed to a maximum of 20 psi. In this environment, the seal reinforcing ring is not necessary and an open groove is provided. For ease of illustration and appreciation of this alternative use of the present invention, like components are identified by like numerals with a primed (') suffix.

In FIG. 4A, a gasket D' is provided in a groove 10' of a first pipe B'. An open groove 30' is provided since a gasket reinforcing member is not necessary. As a leading face 72' of a second pipe C' approaches a leading lip 24' of the gasket, the face 72' will encounter a leading lip leading surface 26' and compress that lip against the gasket body 20'. Since there is no reinforcing ring in the groove 30', an upper groove surface 32' will be compressed down against a bottom groove surface 38' as shown in FIG. 4B.

Of course, in this situation, as the leading lip 24' is pushed into the gasket body 20' it does not spread as far back in the groove 30' as in the embodiments of FIGS. 1-3 since there is no reinforcing or locking ring to resist downward movement of the leading lip 24' and to force rearward movement of the same. Thus, in this instance, the leading lip back face 28' contacts the bottom wall 38' of the groove 30' instead of contacting the groove's back wall 36' as in the embodiments of FIGS. 1-3.

Since there is no reinforcing ring in this embodiment, the compression seal of the leading lip 26' against the outer periphery 74' of the second pipe C' will be much more tenuous and thus would not be able to handle the relatively high pressures which the embodiment of FIGS. 1-3 could handle. Instead, this embodiment is designed for a low pressure environment, such as in pressurized or gravity sewer pipes, where the maximum pressure likely to be experienced by the pipeline is 20 psi.

As with the embodiment of FIG. 3, the first lip 24' will center the second pipe C' and will wipe the outer periphery 74' thereof to provide a clean surface against which a second or pressure activated sealing lip 42' may seal.

With reference now to FIG. 4C, the second pipe C' is shown as having extended over the pressure actuated sealing lip 42' such that the outer periphery 74' of the second pipe has bent the pressure actuated sealing lip 42' back against the gasket body 20' toward an indented portion 76' of the first pipe B'. The second pipe C' is inserted until its forward edge 72' becomes positioned near the indented portion 76'.

As was the case with the embodiment of FIG. 3C, with the pressure of the sealing lip 42' against the gasket body 20' pushing the gasket body into the first pipe groove 10', the ridged surface 60' is forced against the groove rear surface 18' to provide a good seal thereagainst. Also, the sealing lip 42' intimately contacts the outer surface 74' of the second pipe C' to provide a seal thereagainst so that all fluid leakage is stopped at the bell 10'.

The subject invention thus provides a gasket or seal assembly which is useful in both high and low pressure sealing environments simply by the addition or removal of a seal reinforcing or locking ring E. The gasket is also provided with a pair of lips, one of which serves as a centering, cleaning and compression sealing lip and the other one of which serves as a pressure actuated sealing lip. Moreover, the gasket is also provided with a ridged outer sealing surface which provides a series of annular seals against a pipe bell of an associated pipe to assure a complete sealing against the bell, as well as preventing movement of the gasket in the pipe groove.

The invention has been described with reference to a preferred embodiment. Obviously, modifications and alterations will occur to others upon the reading and understanding of this specification. It is intended to include all such modifications and alterations insofar as they come within the scope of the appended claims or the equivalents thereof.

Having thus described a preferred embodiment of the invention, it is now claimed:

1. A dual function gasket assembly capable of both high and low pressure sealing and suitable for insertion into a groove formed in a bell of a pipe, comprising:
    an annular gasket body made of a resilient material, said body terminating radially inwardly in a leading lip and a pressure actuated sealing lip spaced rearwardly therefrom;
    an annular groove provided in said gasket body, a rear portion of said leading lip overhanging said groove; and,
    an annular locking ring selectively insertable into said groove, said ring being made of a material harder than said gasket body, said ring being insertable in said groove when a high pressure seal is desired and being removable when only a low pressure seal is desired, said leading lip and groove being so dimensioned that said rear portion of said leading lip extends completely across a top surface of said locking ring to enclose said locking ring in said gasket body when the gasket assembly is used to provide a high pressure seal between two associated pipes.

2. The gasket assembly of claim wherein said gasket body terminates outwardly in a generally polygonal outer face including at least one planar section and a ratchet surfaced section disposed at an angle thereto, said outer face sealing against an inner surface of an associated pipe bell.

3. The gasket assembly of claim 2 wherein said ratchet surfaced section engages an inner side of said associated pipe bell along at least two separate spaced annular surfaces.

4. The gasket assembly of claim 2 wherein said ratchet surfaced section comprises a plurality of spaced annular ribs which each engage said pipe bell inner surface to prevent leaks therealong and to prevent movement of the gasket in the bell.

5. The gasket assembly of claim 1 wherein said annular groove is rectangular in cross section and wherein said ring is also rectangular in cross section.

6. The gasket assembly of claim 1 wherein said annular groove is located between said leading lip and said pressure actuated sealing lip.

7. The gasket assembly of claim 1 wherein said pressure actuated sealing lip extends further radially inwardly than said leading lip.

8. The gasket assembly of claim 1 wherein said leading lip is conically shaped and serves as a pipe centering and cleaning face and a radially inward portion thereof also serves as a compression sealing face.

9. The gasket assembly of claim 1 wherein said gasket body leading lip rear portion extends over only a portion of said annular groove when a low pressure seal is provided between two associated pipes and said locking ring is not positioned in said groove.

10. The gasket assembly of claim 1 wherein as the assembly is positioned in the groove of one associated pipe and said second associated pipe is inserted into said one associated pipe, said leading lip is compressed against said gasket body and said leading lip rear portion extends further over a top face of said locking ring than when said second pipe is removed from said one pipe.

11. The gasket assembly of claim 1 wherein said leading lip is used to wipe clean an outer surface of a smaller diameter one of said associated pipes, which is inserted into a larger diameter one of said associated pipes, so that said pressure actuated sealing lip can provide a thorough seal against said associated pipe outer surface.

12. A pipe joint comprising:
an outer pipe having an annular groove therein;
an inner pipe inserted into said outer pipe; and,
a gasket assembly positioned within said outer pipe annular groove and adapted to provide a seal between said outer pipe and said inner pipe, said gasket assembly comprising:
an annular gasket body fabricated of a resilient material, said body terminating radially inwardly in a leading lip which serves to center and clean said inner pipe as well as provide a compression seal thereagainst and a rearwardly spaced pressure actuated sealing lip,
an annular groove provided in said body between said leading lip and said sealing lip with a rear portion of said leading lip overhanging said groove, and,
an annular locking ring selectively insertable in said groove, said ring being made of a material harder than said gasket body, said ring being inserted in said groove when a high pressure seal is desired and being removed when a low pressure seal is desired, said groove and said leading lip being so dimensioned that said leading lip rear portion extends completely across a top surface of said locking ring to enclose said locking ring in said gasket body when the gasket assembly is used to provide a high pressure seal.

13. The pipe joint of claim 12 wherein the pipe joint is a bell and spigot joint.

14. The pipe joint of claim 12 wherein said outer pipe annular groove is provided with annular surfaces which are engaged by corresponding radially outward terminating annular surfaces on said gasket as said inner pipe is being inserted into said outer pipe to provide radial force to said gasket whereby said gasket is maintained in said outer pipe annular groove.

15. The pipe joint of claim 12 wherein said gasket body leading lip rear portion extends over only a portion of said annular groove when said locking ring is not positioned in said groove and a low pressure seal is provided between said first and second pipes.

16. The pipe joint of claim 12 wherein said leading lip and said pressure actuated sealing lip are both conically shaped.

17. The pipe joint of claim 16 wherein said leading lip serves as a pipe centering and cleaning face and a radially inward portion thereof also serves as a compression sealing face.

18. The pipe joint of claim 12 wherein said gasket body terminates radially outwardly in a ratchet surfaced section which prevents movement of said gasket against said outer pipe groove when said inner pipe is inserted into said outer pipe.

19. The pipe joint of claim 12 wherein said pipe joint is capable of withstanding pressures of at least 50 psi when said locking ring is inserted in said gasket groove.

20. The pipe joint of claim 12 wherein said pipe joint is capable of withstanding pressures of at least 20 psi when said locking ring is not inserted in said gasket groove.

* * * * *